V. STASCH.
SAFETY BRAKE.
APPLICATION FILED OCT. 31, 1911.
1,056,717.
Patented Mar. 18, 1913.
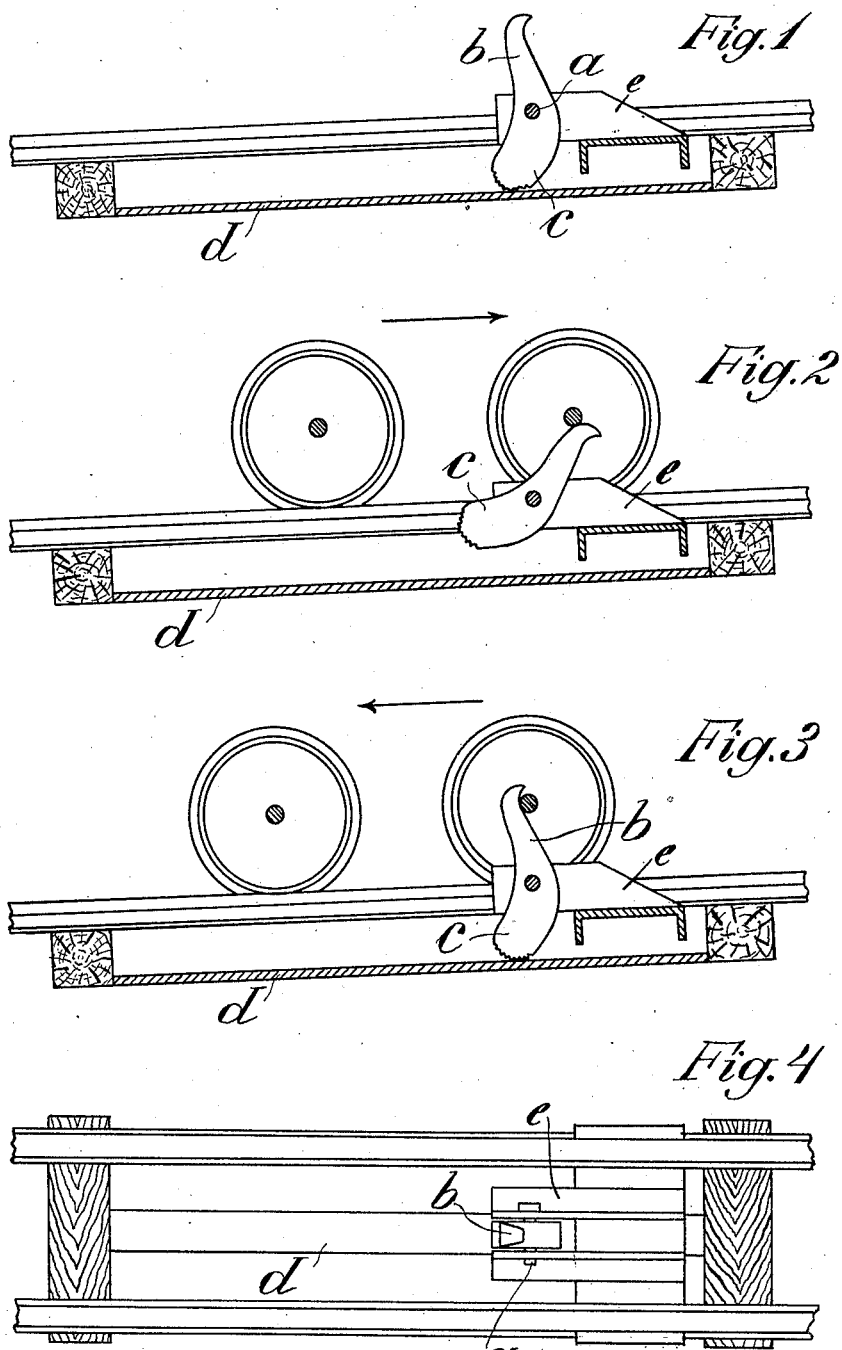
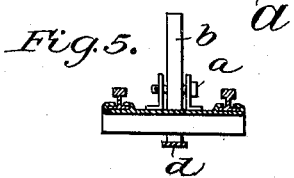
Witnesses:
Inventor:
VALENTIN STASCH

UNITED STATES PATENT OFFICE.

VALENTIN STASCH, OF FRIEDENSHÜTTE, GERMANY.

SAFETY-BRAKE.

1,056,717.  Specification of Letters Patent.  Patented Mar. 18, 1913.

Original application filed June 22, 1911, Serial No. 634,814. Divided and this application filed October 31, 1911. Serial No. 657,801.

*To all whom it may concern:*

Be it known that I, VALENTIN STASCH, a citizen of the German Empire, and resident of Friedenshütte, Silesia, German Empire, have invented a new and useful Improvement in Safety-Brakes, of which the following is a full, clear, and exact description.

The present invention consists of a device for stopping runaway trucks on inclined railway tracks and consists substantially in a frame mounted between the rails and having a pivoted lever supported therein with a hooked upper end and a cam-shaped milled or toothed lower end, the said lever being so supported that when the trucks or cars move up the track they will simply depress the same and pass over it, but if a runaway truck gets loose and runs down the track, the hook of the lever will catch or engage the axle or any other part of the truck and the lever will be moved round its pivot, so that its cam-shaped end engages a plate mounted beneath the rails and will act as a brake, thus stopping the truck.

The present application is a division of my United States Patent No. 1,031,152, issued July 2, 1912, Serial No. 634,814, filed June 22, 1911.

The invention is illustrated in the accompanying drawings, Figure 1 being a sectional side elevation of the device showing the lever in its operative position to stop a truck, Fig. 2 is a similar elevation, showing the truck passing up the track in the direction of the arrow and depressing the lever, Fig. 3 shows the lever in engagement with the axle of a runaway truck, Fig. 4 is a plan of the device, and Fig. 5 is a cross section, showing the plate and the manner in which it is attached to the rails.

The frame $e$ carries a pivot $a$ and may either be fixed between the rails or may slide on the same. Mounted on the pivot $a$ is the brake lever having a hooked upper part $b$ and a cam-shaped lower part $c$ with a milled or toothed edge which is adapted to engage the plate $d$ mounted beneath the same under the rails.

As will be readily understood from the drawings, when the truck moves up the track (Fig. 2) it will simply run over the lever $b$ $c$ but if a runaway truck (Fig. 3) runs down the rails in the direction of the arrow (Fig. 3) it will engage the hooked end $b$ of the lever and cause the cam end $c$ to contact with the plate $d$ so that the truck will either be stopped at once if the frame $e$ is fixed or will be stopped gradually if the frame is adapted to slide along the rails to the extent of the plate $d$.

I claim as my invention:—

A device for stopping runaway trucks or cars on inclined tracks consisting of a frame mounted to slide on the track rails, a lever loosely pivoted in said frame between the track rails to normally extend upwardly, a brake rail beneath the track, said lever having means at its upper end for engaging the truck and having means at its lower end for engaging with the brake rail when the upper end of said lever is violently struck by a runaway truck.

In testimony whereof I affix my signature in the presence of two witnesses.

VALENTIN STASCH.

Witnesses:
FRANK G. POTTS,
ERNST KATZ.

Copies of this patent may be obtained for five cents each, by addressing the "Commissioner of Patents, Washington, D. C."